United States Patent [19]

Erfeling

[11] 4,153,010
[45] May 8, 1979

[54] DEVICE FOR FEEDING ANIMALS

[75] Inventor: Arthur Erfeling, Cuxhaven, Fed. Rep. of Germany

[73] Assignee: Lohmann-Apparatebau GmbH, Cuxhaven, Fed. Rep. of Germany

[21] Appl. No.: 800,225

[22] Filed: May 25, 1977

[30] Foreign Application Priority Data

Nov. 20, 1976 [DE] Fed. Rep. of Germany ....... 2652844

[51] Int. Cl.² .............................................. A01K 5/02
[52] U.S. Cl. .............................. 119/52 AF; 119/56 R
[58] Field of Search .............. 119/52 AF, 52 R, 52 B, 119/53, 57, 51 CF, 18, 56 R; 141/172, 173, 175, 275, 374; 198/727, 734, 735

[56] References Cited

U.S. PATENT DOCUMENTS

| 2,738,766 | 3/1956 | Hart | 119/52 |
|---|---|---|---|
| 3,029,925 | 4/1962 | Martin et al. | 119/53 X |
| 3,719,170 | 3/1973 | Peterson | 119/52 AF |
| 3,776,194 | 12/1973 | Conley | 119/18 X |
| 3,901,194 | 8/1975 | Meyer et al. | 119/52 AF X |

FOREIGN PATENT DOCUMENTS 1203024 7/1959 France ...................................... 119/52

Primary Examiner—Louis G. Mancene
Assistant Examiner—Robert P. Swiatek
Attorney, Agent, or Firm—Andrus, Sceales, Starke & Sawall

[57] ABSTRACT

A device for feeding animals has a tubular conduit with feed delivery openings. An inverted U-shaped dispensing channel embraces the conduit with flanges extending below the conduit along either side. A vertically movable feed trough moves between a lower feeding position and an upper loading position in which the bottom of the trough engages the flanges of the dispensing channel. A conveyor supplies feed to the tubular conduit and through the delivery openings to the space defined by the raised feed trough and the abutting flanges. When the space is full, the conveyor is stopped and the trough lowered to the feeding position.

8 Claims, 2 Drawing Figures

DEVICE FOR FEEDING ANIMALS

BACKGROUND OF THE INVENTION

This invention relates to a device for feeding cattle or other animals. There are already known devices of the kind comprising a fodder delivery conduit provided with fodder delivery openings on the underside thereof for delivering the fodder, a conveyor for conveying fodder through the conduit, and a dispensing device by means of which the fodder emerging from fodder delivery openings is delivered in an accurately dispensed quantity into a fodder trough situated below it.

A cattle feeding device of this kind is known, for example, from German Auslegeschrift No. 1,607,062. In this known device, the dispensing device consists of a distribution container into which the fodder coming out of the fodder delivery openings falls, and which is half as long as the fodder trough. This distribution container has a delivery opening at each of its two ends and can be moved at a regular speed backwards and forwards between the ends of the trough in such a manner that its upper opening always remains below the delivery openings in the fodder delivery conduit. Inside the distribution container there is a reversible conveying element which conveys fodder in the direction of movement of the distribution container and travels at the same speed in relation to the distribution container as the distribution container itself moves over the fodder trough. An even distribution of the fodder along the length of the trough is thus achieved.

Apart from the fact that with the above described known device no particular degree of dispensing accuracy can be achieved, as this is dependent essentially on the regularity of delivery of quantities of fodder from the delivery conduit, the device is expensive and subject to interruptions because of the moving parts as well as the drive mechanisms necessary for these.

The object of the invention is to provide an animal feeding device which distinguishes itself by a simple construction, i.e. features few moving parts, and which can be regulated to provide an accurately dispensed amount of feed in a continuously variable manner while ensuring, at the same time, that the feed is evenly distributed along the length of the feed trough.

SUMMARY OF THE INVENTION

According to the invention there is provided a device for feeding cattle or other animals comprising a fodder delivery conduit having fodder delivery openings in the underside thereof, conveyor means for conveying fodder through the conduit, a longitudinal dispensing channel embracing the conduit and movable vertically relatively thereto, the dispensing channel having downwardly extending flanges which extend below the underside of the conduit, a fodder trough disposed vertically below the fodder delivery conduit, and means for moving the fodder trough vertically between a lower feeding position and an adjustable upper loading position in which the internal bottom surface of the trough engages the lower edges of the flanges of the dispensing channel, whereby the vertical position of the dispensing channel relative to the fodder delivery conduit may be varied by adjusting the upper loading position of the trough.

When the fodder trough is in the upper loading position, the fodder emerging from the delivery conduit through the fodder delivery openings is delivered directly on to the bottom of the fodder trough. The dispensing channel standing on the trough bottom forms a closed housing with its two lateral flanges which prevent lateral spreading of the fodder on the bottom of the trough. Because of the vertical movability of the dispensing channel relative to the delivery conduit, the dispensing channel can be raised by the movement of the fodder trough until the lower edges of its flanges come level with the fodder delivery openings, i.e. the bottom of the fodder trough comes in contact with the underside of the delivery conduit. In this event, loading of the trough is no longer possible. A maximum amount of fodder is delivered to the fodder trough when its internal bottom surface just touches the lower edges of the flanges of the dispensing channel, i.e. when it has not displaced the dispensing channel upwardly with respect to the delivery conduit.

Between these two extreme positions, intermediate positions as required are, of course, possible so that by the degree of approach of the fodder trough to the delivery conduit, the amount of fodder to be delivered can be adjusted. Thus the amount of fodder to be delivered can be continuously regulated.

After the finish of the loading process, i.e. when the space provided by the dispensing channel is filled with fodder, and any excess fodder in the delivery conduit has been removed by the conveyor means, the fodder trough is lowered into the lower feeding position. As the trough moves downwardly away from the dispensing channel the fodder previously contained within the dispensing channel spreads out into the trough. Thus each animal has at its disposal, in the feeding position of the trough, an accurately dispensed amount of fodder, evenly distributed. After the feeding time is over, the fodder trough is raised once again into the loading position and can there be newly loaded with fodder.

The animal feeding device according to the invention is distinguished by a simple construction as the dispensing device normally remains stationary and is only displaced by relatively small amounts in a vertical direction by the movement of the fodder trough.

A specially preferred embodiment of the invention is distinguished by the fodder delivery conduit being mounted on the ceiling of the animal shed. This embodiment has the advantage that the delivery of the fodder into the trough does not take place immediately in the vicinity of its feeding position. There is thus a free area around the trough when it is in the feeding position and the fodder delivery conduit is not exposed to damage by the animals or when carrying out any work in the shed. In usual type of animal shed there is ample room on the ceiling for such purposes.

Advantageously, the fodder delivery conduit may comprise a tube, and the fodder delivery openings may be provided by a continuous slot in the underside of the tube. The conveyor means may, in this case, comprise a chain conveyor device passing longitudinally through the tube. This design has proved itself to be particularly without problems and operationally sound, as on the one hand there is little danger of blocking of the fodder delivery openings and an even distribution of fodder is achieved over the length of the trough, and, on the other hand, the combination of delivery tube and chain conveyor device (which may comprise conveying elements simply fastened to a chain drawn through the slotted tube) has proved itself unsusceptible to trouble. Of course, similar fodder conveyors such as worm conveyors etc., can be employed. The delivery tube may be of circular or other cross-sectional shapes. Alternatively the delivery conduit may even be in the form of an open channel.

The vertically movable fodder trough is advantageously provided with a flat bottom internal surface so as to ensure a firm seating of the lower edges of the dispensing channel on the trough bottom in the loading position. This design of trough bottom has moreover the advantage that if there is any lateral displacement of the fodder trough in the loading position, the dispensing channel retains the same vertical position and does not assume an inclined position as would be the case, for example, with a V-shaped trough bottom. Furthermore, the volume of the space enclosed by the flanges of the dispensing channel and the fodder trough will not change if the trough is displaced laterally with respect to the dispensing channel. It is however quite conceivable that for special applications, inclined fodder trough bottoms could be used, in which case, however, suitable corresponding arrangements would have to be made in order to avoid lateral displacement of the fodder trough as it is moved up and down.

It has already been mentioned that the vertical position of the dispensing channel is varied by the up and down movement of the fodder trough between the position where it first engages the dispensing channel and the position where it engages the underside of the delivery conduit. This adjustment can be done in a particularly simple manner in an embodiment in which the delivery conduit is a tube of substantially circular cross-section and the dispensing channel has a rounded upper part which fits over the upper part of the tube when the dispensing channel is in its lowermost position relative to the tube. When the trough is in the lower feeding position, the dispensing channel rests on the upper side of the delivery tube. On the dispensing channel being raised by upward movement of the fodder trough, its rounded upper part separates from the upper side of the delivery tube, and on subsequent lowering of the trough, the dispensing channel assumes its original position. It can be seen that for such an operation no expensive guide devices have to be provided. Of course, the flanges of the dispensing channel can, for example, extend outwards so that the space available between them for fodder is increased. However, in this case a reduction in stability must possibly be taken into account in a raised position of the dispensing channel, as its flanges will not then closely embrace the delivery tube.

The fodder trough itself may be quite simply suspended on ropes which pass over rollers mounted on the ceiling and which can be moved up and down by means of a draw bar connected to said ropes and movably mounted on said ceiling. This preferred arrangement is simple to operate and subject to little trouble. Of course, other applicable constructions are conceivable to effect vertical movement of the fodder trough. Such constructions will be apparent to the skilled man and do not need to be described in detail.

The fodder delivery conduit and the dispensing channel preferably extend over substantially the whole length of the fodder trough and the animal shed. By this means a single operator can carry out the feeding operation over the whole length of the animal shed. The operator only needs to set the fodder conveyor in the delivery conduit in motion and, after the dispensing has been carried out, lower the fodder trough and carry out the operation of raising the trough after feeding is finished. It should be once more emphasized that by means of the device constructed according to the invention, all the animals distributed along the length of an animal shed may receive simultaneously an accurately dispensed amount of fodder, which is not possible with the known device described in the introduction.

The following is a more detailed description of a preferred embodiment of the invention, reference being made to the accompanying drawings.

DETAILED DESCRIPTION OF THE PREFERRED EMBODIMENT

Figure 1:
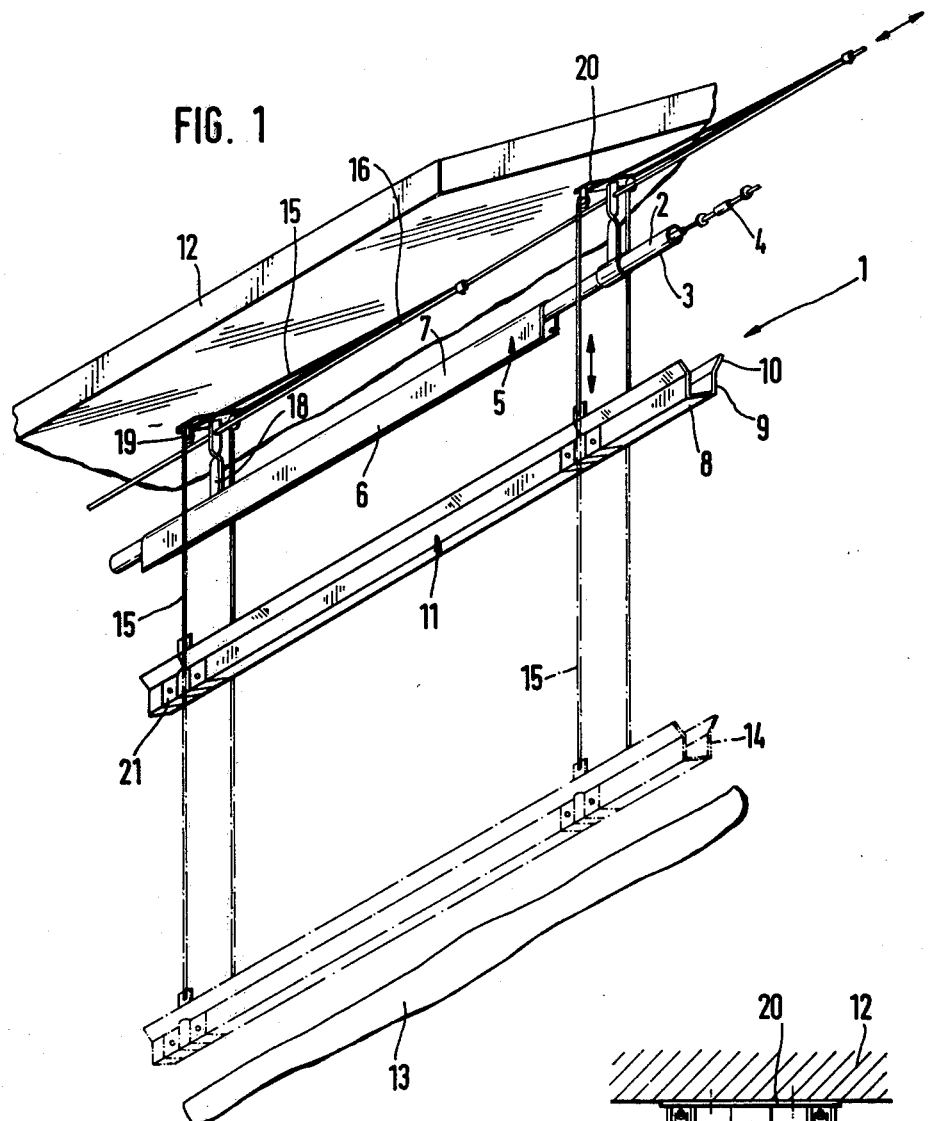
FIG. 1 is a partial perspective view of an animal feeding device according to the invention.

Referring to FIG. 1, the feeding device 1 for cattle or other animals, such as hogs or poultry consists of a fodder conveyor tube 2 passing somewhat below the ceiling 12 of an animal shed and parallel to a height-adjustable fodder trough 11, the fodder conveyor tube being attached by suitable suspension elements 18 to the ceiling 12. The fodder conveyor tube 2 is provided on its underside with a continuous slot 3 through which the conveyed fodder 17 is delivered into the fodder trough 11. A chain conveyor device 4 is located within the conveyor tube, this conveyor device consisting of a chain together with conveying elements which substantially match the tube cross-section and are attached to the chain at intervals along the length thereof. By pulling the chain through a suitable supply of fodder and subsequent pulling it through the conveyor tube 2, the fodder 17 between the individual conveying elements is brought into the vicinity of the slot 3 and can there emerge from the conveyor tube 2. Such chain conveyor devices are generally endless so that a continuous conveying of fodder through the slotted conveyor tube is possible.

Figure 2:
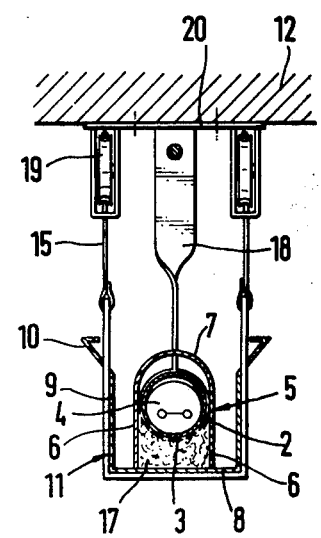
FIG. 2 is a vertical section through the conveyor channel, dispenser channel and fodder trough, in the loading position, of the device of FIG. 1.

As can also be seen in FIG. 1, a dispensing channel 5 is situated above the conveyor tube 2. The rounded upper part 7 of the dispensing channel rests on the conveyor tube 2 and both its side walls 6 extend practically vertically downwards past the lower side of the conveyor tube 2. The dispensing channel 5 cooperates with the height-adjustable fodder trough 11 which can be moved between an upper loading position in which the lower edges of the side walls of the dispensing channel 5 rest on the bottom 8 of the fodder trough (as shown in FIG. 2), and a lower feeding position 14 which is indicated by broken lines in FIG. 1. In the lower feeding position 14, in which the fodder trough is lowered into the vicinity of the floor 13 of the animal shed, the animals in the shed can get to the fodder 17. When the feeding period is over, the trough is raised to the upper loading position and can be loaded again with fodder. This up and down movement of the trough 11 is effected by means of ropes 15 by which the trough is suspended at intervals along its length. These ropes are taken over rollers 19 mounted on the ceiling 12 and are attached to a draw bar 16. By suitable movement of the draw bar 16, which may be effected by hand or by a suitable drive, the ropes are either pulled so that the fodder trough is raised, or released so that the trough is lowered. The device described is simple in construction and demands little equipment. The guide rollers 19 are simply attached to the ceiling by suitable mountings 20 and a suitable guide for the draw bar 16 may be provided by passing the draw bar through holes in the suspension elements 18 which are provided for supporting the conveyor tube.

The actual loading process of the fodder trough 11, which is made up of various sections connected by joints 21, can best be seen from FIG. 2. In FIG. 2 the fodder trough 11 is shown in section in the upper loading position, in which the lower edges of the side walls 6 of the dispensing channel 5 rest on the flat bottom 8 of the trough. Furthermore, the trough is so dimensioned and shaped that, in the loading position, the dispensing channel together with the conveyor tube 2 can be received in it. The trough 11 has two practically vertical side walls 9 whose upper edge areas 10 are bent diagonally outwards in order to avoid injuries to the animals when feeding.

As can also be seen from FIG. 2, in the upper loading position the fodder trough 11 is raised to such a level that it has raised the rounded upper part 7 of the dispensing channel 5 from the upper side of the conveyor tube 2. In this position, the dispensing channel 5 forms, with its two side walls 6 standing on the flat trough bottom 8, a closed housing which prevents the spreading out of the fodder emerging from the slot 3. When the fodder trough has been brought to this upper loading position, the fodder conveying device 4 is set in motion and fodder is conveyed through the tube 2 and out through the slot 3 until the space formed by the underside of the conveyor tube, the side walls 6 of the dispensing channel, and the trough bottom 8 is completely filled with fodder.

When this has taken place over the entire length of the dispensing channel, excessive conveyed fodder is simply fed onwards through the conveyor tube 2 and back to the supply of fodder. When this occurs, the conveying device 4 is stopped and the fodder trough can now be lowered into the feeding position 14. It is obvious that, as this occurs, the fodder is released from the dispensing channel 5 and spreads out in the trough 11. However, since an accurately dispensed amount of fodder is now in the fodder trough, this can cause no harm. After the feeding time is over, the fodder trough is raised again into the upper loading position.

Apart from the simple construction permitted by the device according to the invention, its special advantages lie in that an accurately dispensed amount of fodder can be made available to the animals in the animal shed, simultaneously along the whole trough. This amount of fodder is infinitely variable and can be adjusted in a simple manner by shortening or lengthening the distance of the trough bottom 8 from the slot 3 of the conveyor tube 2 when the trough is in the upper loading position. Furthermore, the fodder conveying device 4 can be left to operate continuously without having to worry that an uneven distribution of fodder over the length of the trough will occur, since the amount of fodder to be dispensed is determined by the volume of the space enclosed by the dispensing channel 5, the trough bottom and the conveyor tube, and on filling this space, additionally conveyed fodder does not arrive in the trough, but continues along the conveyor tube.

What I claim is:

1. A device for feeding animals comprising a feed delivery conduit having feed delivery openings in the underside thereof, conveyor means for conveying feed through the conduit, a longitudinal dispensing channel embracing the conduit and movable vertically relative thereto, the dispensing channel having downwardly extending flanges which extend below the underside of the conduit, a feed trough disposed vertically below the feed delivery conduit, and means for moving the feed trough vertically between a lower feeding position and an adjustable upper loading position in which the internal bottom surface of the trough engages the lower edges of the flanges of the dispensing channel, whereby the vertical position of the dispensing channel relative to the feed delivery conduit may be varied by adjusting the upper loading position of the trough.

2. A device for feeding animals according to claim 1 wherein, in use of the device, said feed delivery conduit is mounted on the ceiling of an animal shed.

3. A device for feeding animals according to claim 1 wherein the feed delivery conduit comprises a tube, and said feed delivery openings are provided by a continuous slot in the underside of the tube.

4. A device for feeding animals according to claim 3 wherein the conveyor means comprise a chain conveyor device passing longitudinally through said tube.

5. A device for feeding animals according to claim 3 wherein the tube is of substantially circular cross-section, and wherein the longitudinal dispensing channel has a rounded upper part which fits over the upper part of the tube when the dispensing channel is in its lowermost position relatively to the tube.

6. A device for feeding animals according to claim 1 wherein said internal bottom surface of the feed trough is substantially flat.

7. A device for feeding animals according to claim 1 wherein the feed trough is suspended on ropes which pass over rollers mounted on the ceiling of an animal shed, and is movable up and down by means of a draw bar connected to said ropes and movably mounted on said ceiling.

8. A device for feeding animals according to claim 1 wherein the feed delivery conduit and dispensing channel extend over substantially the whole length of the feed trough.

* * * * *